United States Patent Office 3,781,328
Patented Dec. 25, 1973

3,781,328
PHENOXY-ALKYL-CARBOXYLIC ACID
COMPOUNDS
Ernst-Christian Witte, Mannheim, Kurt Stach, Mannheim-Waldhoe, Max Thiel, Mannheim, Felix Helmut Schmidt, Mannheim-Seckenheim, and Harald Stork, Mannheim-Feudenheim, Germany, assignors to Boehringer Mannheim G.m.b.H., Mannheim, Germany
No Drawing. Filed Sept. 7, 1972, Ser. No. 287,114
Claims priority, application Germany, Oct. 1, 1971, P 21 49 070.0; June 22, 1972, P 22 30 383.9
Int. Cl. C07c 103/30
U.S. Cl. 260—471 R     23 Claims

ABSTRACT OF THE DISCLOSURE

Novel phenoxy-alkyl-carboxylic acid compounds of the formula:

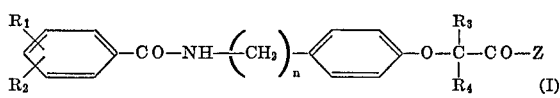

wherein $R_1$ and $R_2$, which may be the same or different, are hydrogen, halogen, lower alkyl or lower alkoxy;
$R_3$ and $R_4$, which may be the same or different, are hydrogen or lower alkyl;
$n$ is 1, 2 or 3; and Z is hydroxyl or lower alkoxy;

and the pharmacologically compatible salts thereof, are remarkably effective in lowering the serum lipid level and cholesterol level without inducing undesirable side effects.

---

The present invention is concerned with new phenoxy-alkyl-carboxylic acid compounds, with therapeutic compositions containing them, and with therapeutic uses thereof.

The new phenoxy-alkyl-carboxylic acid derivatives according to the present invention are compounds of the general formula:

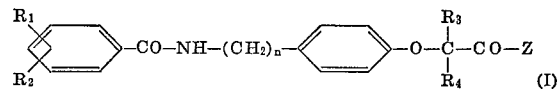

wherein $R_1$ and $R_2$, which may be the same or different, are hydrogen, halogen, lower alkyl or lower alkoxy;
$R_3$ and $R_4$, which may be the same or different, are hydrogen or lower alkyl;
$n$ is 1, 2 or 3; and Z is hydroxyl or lower alkoxy;

and the pharmacologically compatible salts thereof.

By the term "lower alkyl" and "lower alkoxy" we mean moieties containing from, e.g., 1 to 10, preferably 1 to 6, carbon atoms.

The new Compounds I according to the present invention show, in animal experiments, a considerable lowering of the serum lipid level and of the cholesterol level, without undesirable side effects occurring. Therefore, the new Compounds I according to the present invention are effective agents against atherosclerosis.

The new compounds according to the present invention can be prepared, for example, by reacting an amine of the general formula:

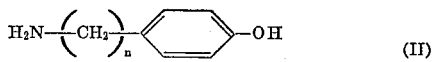

wherein $n$ has the same meaning as above, optionally after introduction of a conventional protective group for the amino or hydroxyl group which is to be temporarily protected, with a derivative of an acid of the general formula:

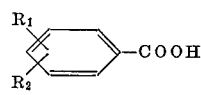

wherein $R_1$ and $R_2$ have the same meanings as above, and with a compound of the general formula:

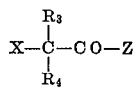

wherein $R_3$, $R_4$ and Z have the same meanings as above and X is a reactive group, whereafter the compounds obtained are, if desired, converted into their pharmacologically compatible salts.

The substituents $R_1$ and $R_2$ and Z can, subsequent to the condensation reaction to give the fundamental structure, either be introduced or changed in known manner.

The condensation of the compounds of General Formula II with the compounds of General Formulae III and IV is preferably carried out by intermediate blocking of one of the two reactive groups in the Compound II with a protective group which can easily be split off and is conventionally used for this purpose, reaction with a compound of General Formula III or IV, splitting off of the protective groups and reaction with the second compound of General Formula III or IV.

As reactive derivatives of the Compounds III, it is especially preferred to use halides, anhydrides or imidazolides of the appropriately substituted benzoic acids which can be reacted, for example, under the conditions of the Schotten-Baumann reaction, i.e. with the addition of a tertiary amine, for example, pyridine or dimethylaniline, in an inert solvent, with the compounds of General Formula II. As inert solvent, it is preferred to use an excess of the tertiary amine. It is also preferred temporarily to block the phenolic hydroxyl group by esterification but a blocking of the phenolic hydroxyl group by etherification with a compound of General Formula IV is especially preferred.

For a primary reaction of Compounds II with Compounds IV, it is advantageous first to convert the amino group of the Compound II into a phthalimide group which, after reaction with, for example, hydrazine or hydroxylamine, can again easily be split off in known manner. As reactive derivatives of the Compounds IV, there are particularly preferred those in which X is an anion of a strong acid, especially of a hydrohalic or sulphonic acid. Furthermore, the reaction can be promoted by converting the phenolic hydroxyl group of the Compound II into a phenolate, for example, by reaction with a sodium alcoholate. The reaction of both components is carried out in inert solvents, for example in toluene or xylene, preferably at an elevated temperature.

The Compounds I can, if desired, be converted into their pharmacologically compatible salts by reaction with a non-toxic inorganic or organic acid.

The present invention also includes pharmaceutical compositions containing at least one of the new compounds of General Formula I, in admixture with a solid or liquid pharmaceutical diluent or carrier.

EXAMPLE 1

Preparation of ethyl α-[4-(benzoylaminoethyl)-phenoxy]-isobutyrate 41.0 g. (292 mMol) benzoyl chloride were added dropwise, in the course of 10 minutes, to 20.1 g. (146 mMol) tyramine in 60 ml. anhydrous pyridine, while stirring and with the exclusion of moisture, and then rinsed with about 50 ml. anhydrous pyridine. The solution, which automatically warmed up upon adding the benzoyl chloride, was subsequently heated to 100° C. for 15 minutes in order to complete the reaction, then cooled to 35° C. and poured into a mixture of about 500 g. ice and water. The resultant crystalline slurry was acidified with dilute hydrochloric acid, filtered off with suction, washed with dilute hydrochloric acid, water and aqueous sodium bicarbonate solution and dried. After recrystallization from acetone, there were obtained 38.3 g. (76% of theory) dibenzoyl-tyramine, which has a melting point of 173–174° C. From the mother liquors, there can be obtained a further 9.9 g. of product, so that the total yield is more than 90% of theory.

38.0 g. (0.11 mol) dibenzoyl-tyramine were suspended in 400 ml. methanol, 130 ml. 2 N aqueous potassium hydroxide solution were added thereto and the mixture was heated for one hour at 40–45° C. After cooling, 130 ml. 2 N hydrochloric acid were added. The precipitate which was formed was filtered off with suction, the filtrate was freed from methanol in a vacuum and the precipitate thereby obtained combined with that from the hydrochloric acid precipitation. The precipitates were washed with water and, for the removal of any benzoic acid which may have been present, digested with an aqueous solution of sodium bicarbonate. After recrystallization from ethanol, there were obtained 23.5 g. (89% of theory) N-benzoyl-tyramine, which has a melting point of 165–166° C.

22.5 g. (93 mMol) N-benzoyl-tyramine were introduced into a solution of 2.14 g. (93 mg.-atom) sodium in 50 ml. anhydrous methanol, the alcohol was evaporated off and the residue was freed from residual solvent in a vacuum, using benzene as the entraining agent. The absolutely dry, powdered phenolate was suspended in 100 ml. anhydrous toluene and 26.7 g. (137 mMol) ethyl α-bromoisobutyrate were added thereto. The suspension was maintained for 25 hours at 80° C. and then evaporated in a vacuum. The residue was taken up in methylene chloride, successively washed with dilute aqueous sodium hydroxide solution, hydrochloric acid and water, dried over anhydrous calcium chloride and evaporated. There were obtained 26.1 g. (79% of theory) ethyl α-[4-(benzoylaminoethyl)-phenoxyl]-isobutyrate which, after recrystallization from ether/ligroin (1:10) and again crystallizing from acetone, has a melting point of 65–66° C.

In an analogous manner, there were obtained from:

(a) 4 - chlorobenzoyl chloride and tyramine: di - (4-chlorobenzoyl)-tyramine (yield 98%; M.P. 203–205° C.); N-(4-chlorobenzoyl)-tyramine (yield 91%; M.P. 174–176° C.); and finally ethyl α-[4-(4-chlorobenzoylaminoethyl)-phenoxy]-isobutyrate (67% of theory; M.P. 96–97° C.);

(b) 2-methoxybenzoyl chloride and tyramine: di-(2-methoxybenzoyl)-tyramine (yield 95%; M.P. 80–81° C.); N-(2-methoxybenzoyl)-tyramine (yield 75%; M.P. 166–167° C.); and finally ethyl α-[4-(2-methoxybenzoylaminoethyl)-phenoxyl]-isobutyrate (87% of theory; oil; refractive index 1.4570);

(c) 2-methoxy-5-chlorobenzoyl chloride and tyramine: di-(2-methoxy - 5 - chlorobenzoyl)-tyramine (yield 98%; M.P. 144–145° C.); N-(2-methoxy - 5 - chlorobenzoyl)-tyramine (yield 93%; M.P. 133–135° C.); and finally ethyl α-[4-(2-methoxy - 5 - chlorobenzoylaminoethyl)-phenoxy]-isobutyrate (61% of theory; oil; refractive index 1.5460).

EXAMPLE 2

Preparation of α-[4-(benzoylaminoethyl)-phenoxy]-isobutyric acid 35.5 g. (0.1 mol) ethyl α-[4-(benzoylaminoethyl)-phenoxy]-isobutyrate were suspended in 1.5 liters dioxan and slowly mixed at ambient temperature with 200 ml. 1 N aqueous potassium hydroxide solution. The suspension was stirred for two hours at ambient temperature and subsequently for one hour at 40° C., the starting material thereby going fully into solution. Subsequently, the reaction mixture was cooled and neutralized with 200 ml. 1 N hydrochloric acid. Thereafter, the solvent was distilled off in a vacuum and the residue was washed with water until free of salt and recrystallized from acetone. There were obtained 25.5 g. α-[4-(benzoylaminoethyl)-phenoxy]-isobutyric acid; M.P. 155–156° C.; yield 78% of theory.

In an analogous manner, there were obtained:

(a) α-[-(4-chlorobenzoylaminoethyl) - phenoxy] - isobutyric acid from ethyl α-[4-(4-chlorobenzoylaminoethyl)-phenoxy]-isobutyrate in a yield of 84% of theory; M.P. 186° C., after recrystallization from acetone.

(b) α-[4 - (2 - methoxybenzoylaminoethyl)-phenoxy]-isobutyric acid from ethyl α-[4 - (2 - methoxybenzoylaminoethyl)-phenoxy]-isobutyrate in a yield of 65% of theory; M.P. 131° C., after recrystallization from acetone; and (c) α - [4 - (2 - methoxy - 5 - chlorobenzoylaminoethyl)-phenoxy]-isobutyric acid from ethyl α - [4 - (2-methoxy - 5 - chlorobenzoylaminoethyl)-phenoxy]-isobutyrate in a yield of 72% of theory; M.P. 137° C. after recrystallization from acetone.

EXAMPLE 3

Preparation of ethyl α-[4-(4-chlorobenzoylaminoethyl)-phenoxy]-isobutyrate

A mixture of 56.8 g. (0.2 mol) N-(4-chlorobenzoyl)-tyramine, 34.5 g. (0.25 mol) anhydrous potassium carbonate and 500 ml. methyl ethyl ketone was stirred for two hours at reflux temperature. Subsequently, 58.5 g. (0.3 mol) ethyl α-bromoisobutyrate were added thereto, and while stirring, the reaction mixture was further boiled for six hours. Thereafter, a further 10.5 g. (0.054 mol) ethyl α-bromoisobutyrate and 13.8 g. (0.1 mol) potassium carbonate were added and the reaction mixture maintained at reflux temperature for a further 16 hours. The solid material on the bottom of the reaction vessel used was filtered off and thoroughly washed with hot acetone. The combined filtrates were evaporated in a vacuum and the crystalline residue was recrystallized from acetone. The product was identical with that obtained in Example 1(a).

In an analogous manner, there were obtained:

(a) Ethyl 4 - benzoylaminoethyl-phenoxyacetate from 4 - benzoylaminoethyl - phenol and ethyl bromoacetate in a yield of 94% of theory. After recrystallization from ethanol, the product has a melting point of 108–109° C.;

(b) Ethyl 4 - (4 - chlorobenzoylaminoethyl)-phenoxyacetate from 4 - (4 - chlorobenzoylaminoethyl) - phenol and ethyl bromoacetate, with a yield of 79% of theory. After recrystallization from acetone, the product has a melting point of 137° C.;

(c) Ethyl 4 - (2 - methoxybenzoylaminoethyl)-phenoxyacetate from 4 - (2 - methoxybenzoylaminoethyl)-phenol and ethyl bromoacetate, with a yield of 80% of theory. After recrystallization from ether, the product has a melting point of 62–63° C.;

(d) Ethyl 4 - (2 - methoxy - 5 - chlorobenzoylaminoethyl)-phenoxyacetate from 4 - (2 - methoxy - 5 - chlorobenzoylaminoethyl)-phenol and ethyl bromoacetate, with a yield of 70% of theory. After recrystallization from isopropanol, the product has a melting point of 79–80° C.

EXAMPLE 4

Preparation of 4-benzoylaminoethyl-phenoxyacetic acid 4-benzoylaminoethyl-phenoxyacetic acid was obtained, in a manner analogous to that described in Example 2, by hydrolysis of the corresponding ethyl ester (obtained according to Example 3(a)), using acetone as solvent. The yield was 89% of theory. After recrystallization from acetone, the product has a melting point of 164–165° C.

In an analogous manner, there were obtained:

(a) 4 - (4 - chlorobenzoylaminoethyl) - phenoxyacetic acid from ethyl 4 - (4 - chlorobenzoylaminoethyl)-phenoxyacetate in a yield of 83% of theory. After recrystallization from acetone, the product has a melting point of 199° C.;

(b) 4 - (2 - methoxybenzoylaminoethyl) - phenoxyacetic acid from ethyl 4 - (2 - methoxybenzoylaminoethyl)-phenoxyacetate in a yield of 72% of theory. After recrystallization from acetone, the product has a melting point of 146–147° C.; and (c) 4 - (2 - methoxy - 5 - chlorobenzoylaminoethyl)-phenoxyacetic acid from ethyl 4 - (2 - methoxy-5-chlorobenzoylaminoethyl)-phenoxyacetate in a yield of 89% of theory. After recrystallization from isopropanol, the product has a melting point of 142–143° C.

EXAMPLE 5

Preparation of ethyl α-(4-benzoylaminomethyl)-phenoxy-isobutyrate 12 g. (75 mMol) 4-hydroxybenzylamine hydrochloride were dissolved in 100 ml. anhydrous pyridine, 10 g. powdered, anhydrous potassium carbonate were added thereto and 21.1 g. (0.15 mol) benzoyl chloride were added dropwise, the temperature thereby rising spontaneously. Subsequently, the reaction mixture was heated to 90° C., concentrated in a vacuum to one third and stirred into 200 ml. water. The pH was now adjusted to 6.5 with hydrochloric acid and the precipitate formed was filtered off with suction, digested with an aqueous solution of sodium bicarbonate and again acidified. Subsequently, the product was recrystallized from ethanol. There were obtained 22.7 g. (95% of theory) [4-(benzoylaminomethyl)-phenyl] - benzoate, which has a melting point of 141–142° C.

16.6 g. (0.05 mol [4 - (benzoylaminomethyl)-phenyl]-benzoate were suspended in one liter acetone and saponified with an aqueous solution of potassium hydroxide in the manner described in Example 1. There were obtained 9.85 g. (87% of theory) 4-benzoylaminomethyl-phenol which, after recrystallization from ethanol, has a melting point of 155–156° C.

4 - benzoylaminomethyl-phenol was reacted with ethyl α-bromoisobutyrate in a manner analogous to that described in Example 1 to give ethyl α - (4 - benzoylaminomethyl)-phenoxyisobutyrate in a yield of 81% of theory. After dissolving in ether and reprecipitating with ligroin the product has a melting point of 75–76° C.

In an analogous manner, there were obtained:

(a) Ethyl α-[4 - (4 - chlorobenzoylaminomethyl)-phenoxy]-isobutyrate from 4-chlorobenzoyl chloride and 4-hydroxybenzylamine hydrochloride via the following intermediate stages: [4-(4 - chlorobenzoylaminomethyl)-phenyl]-4-chlorobenzoate (yield 67% of theory; M.P. 174–175° C.); 4-(4-chlorobenzoylaminomethyl)-phenol (yield 92% of theory; M.P. 194–195° C.); and finally ethyl α-[4-(4-chlorobenzoylaminomethyl)-phenoxy]-isobutyrate (yield 74% of theory; M.P. 70–71° C., after dissolving in ether and reprecipitating with ligroin).

(b) Ethyl α-[4-(2 - methoxybenzoylaminomethyl)-phenoxy]-isobutyrate from 2-methoxybenzoyl chloride and 4-hydroxybenzylamine hydrochloride via the following intermediate stages: [4-(2 - methoxybenzoylaminomethyl)-phenyl]-2-methoxybenzoate (yield 74% of theory; M.P. 113–114° C.); 4-(2-methoxybenzoylaminomethyl)-phenol (yield 72% of theory; M.P. 146–147° C.); and finally ethyl α-[4-(2-methoxybenzoylaminomethyl)-phenoxy]-isobutyrate (yield 63% of theory, nondistillable oil; $n_D^{20}$: 1.5535).

(c) Ethyl α-[4-(2-methoxy - 5 - chlorobenzoylaminomethyl)-phenoxy]-isobutyrate from 2-methoxy-5-chlorobenzoyl chloride and 4-hydroxybenzylamine hydrochloride via the following intermediate stages: [4-(2-methoxy - 5 - chlorobenzoylaminomethyl) - phenyl]-2-methoxy-5-chlorobenzoate (yield 54% of theory; M.P. 145–146° C.); 4-(2-methoxy - 5 - chlorobenzoylaminomethyl)-phenyl (yield 90% of theory; M.P. 159–160° C; and finally ethyl α-[4-(2-methoxy - 5-chlorobenzoylaminomethyl)-phenoxy]-isobutyrate (yield 82% of theory; M.P. 82–83° C.).

EXAMPLE 6

Preparation of ethyl 4-benzoylaminomethyl phenoxyacetate

A mixture of 20.0 g. 4-benzoylaminomethyl-phenol, 12.2 g. (88 mMol) powdered potassium carbonate and 200 ml. anhydrous methyl ethyl ketone were maintained at reflux temperature, while stirring, then cooled somewhat and 16.8 g. (0.1 mol) ethyl bromoacetate and some potassium iodide added thereto and further maintained at reflux temperature for six hours. The inorganic components were filtered off with suction and washed with chloroform. The filtrates were combined, extracted with dilute aqueous sodium hydroxide solution, washed neutral with water and dried over anhydrous calcium chloride. After evaporation in a vacuum, the residue obtained was recrystallized from acetone. There was obtained ethyl 4-benzoylaminomethylphenoxyacetate in a yield of 77% of theory; M.P. 96–97° C.

In an analogous manner, there were obtained:

(a) Ethyl 4-(4-chlorobenzoylaminomethyl)-phenoxyacetate from 4-(4-chlorobenzoylaminomethyl)-phenol and ethyl bromo-acetate in a yield of 68% of theory. After recrystallization from acetone, the product has a melting point of 125–126° C.;

(b) Ethyl 4 - (2 - methoxybenzoylaminomethyl)-phenoxyacetate from 4-(2-methoxybenzoylaminomethyl)-phenol and ethyl bromoacetate in a yield of 70% of theory. The product is an oil with a refractive index of 1.5685;

(c) Ethyl 4-(2-methoxy - 5 - chlorobenzoylaminomethyl)-phenoxyacetate from 4-(2-methoxy-5-chlorobenzoylaminomethyl)-phenol and ethyl bromoacetate in a yield of 78% of theory. After recrystallization from isopropanol, the product has a melting point of 86–87° C.

EXAMPLE 7

The following products were obtained in a manner analogous to that described in Example 2:

(a) α-[4-(benzoylaminomethyl)-phenoxy] - isobutyric acid from ethyl α-[4-(benzoylaminomethyl)-phenoxy]-isobutyrate in a yield of 52% of theory; after recrystallization from ethanol, the product has a melting point of 168–169° C.;

(b) α[-(4 - (4-chlorobenzoylaminomethyl) - phenoxyl isobutyric acid from ethyl α-[4-(4-chlorobenzoylaminomethyl)-phenoxy]-isobutyrate in a yield of 87% of theory; after recrystallization from ethanol, the product has a melting point of 191–192° C.;

(c) α-[4-(2-methoxybenzoylaminomethyl) - phenoxy]-isobutyric acid from ethyl α-[4-(2-methoxybenzoylaminomethyl)-phenoxy]-isoutyrate in a yield of 89% of theory; after recrystallization from acetone, the product has a melting point of 114° C.;

(d) α-[4-(2-methoxy-5-chlorobenzoylaminomethyl)-phenoxy]-isobutyric acid from ethyl α-[4-(2-methoxy-5-chlorobenzoylaminomethyl)-phenoxy]-isobutyrate in a yield of 72% of theory; after recrystallization from acetone, the product has a melting point of 146–147° C.;

(e) 4-benzoylaminomethyl-phenoxyacetic acid from ethyl 4-benzoylaminomethyl-phenoxyacetate in a yield of 90% of theory; after recrystallization from acetone, the product has a melting point of 153–154° C.;

(f) 4-(4-chlorobenzoylaminomethyl)-phenoxyacetic acid from ethyl 4-(4-chlorobenzoylaminomethyl)-phenoxyacetate in a yield of 73% of theory; after recrystallization from acetone, the product has a melting point of 170–171° C.;

(g) 4-(2-methoxybenzoylaminomethyl)-phenoxyacetic acid from ethyl 4-(2-methoxybenzoylaminomethyl)-phenoxyacetate in a yield of 73% of theory; after recrystallization from acetone, the product has a melting point of 158–159° C.;

(h) 4-(2-methoxy-5-chlorobenzoylaminomethyl)-phenoxyacetic acid from ethyl 4-(2-methoxy-5-chlorobenzoylaminomethyl)-phenoxyacetate in a yield of 88% of theory; after recrystallization from ethanol, the product has a melting point of 152–153° C.

EXAMPLE 8

Preparation of ethyl α-[4-(benzoylaminoethyl)-phenoxy]-isobutyrate.—A mixture of 44.8 g. (0.25 mol) N-acetyl-tyramine, 69.5 g. (0.5 mol) anhydrous, powdered potassium carbonate and 750 ml. anhydrous butan-2-one were heated under reflux for two hours, while stirring, 73.2 g. (0.375 mol) ethyl α-bromoisobutyrate and 1 g. potassium iodide then added thereto and the reaction mixture further heated under reflux.

After boiling for 40 and 70 hours, respectively, there were, in each case, added a further 35 g. potassium carbonate and 36.6 g. ethyl α-bromoisobutyrate. After a total reaction period of 130 hours, the reaction mixture was evaporated in a vacuum, poured into ice water and then extracted with ether. The ethereal extract was washed three times with 0.5 N aqueous sodium hydroxide solution, then with water and finally dried over anhydrous calcium chloride and evaporated. There remained 83.8 g. of an oily residue, which still contained ethyl α-bromoisobutyrate. The oil was maintained for five hours at 70° C. and at a pressure of 0.1 mm. Hg, then cooled. The resultant crystalline slurry was washed with ligroin and dried. There were obtained 69.8 g. (95% of theory) of product. The melting point of the still not quite pure ethyl α-[4-(2-acetaminoethyl)-phenoxy]-isobutyrate was 48–51° C.

A solution of 119.1 g. (0.407 mol) ethyl α-[4-(2-acetaminoethyl)-phenoxy]-isobutyrate in 750 ml. alcohol was mixed with a solution of 224.4 g. (4.00 mol) potassium hydroxide in 800 ml. water and heated under reflux for eight hours. While cooling, there were added exactly 4.00 ml. hydrogen chloride (for example, in the form of 2 N hydrochloric acid), the reaction mixture which further cooled and, after some time, the crystals which separated out were filtered off with suction. These were washed with water and dried; there were obtained 48.4 g. (53% of theory) of product which melted, with decomposition, at 274° C. From the mother liquor there were obtained, after distilling off the alcohol and cooling, a further 32.5 g. (36% of theory) of product, with a melting point of 263–270° C. The crude α-[4-(2-aminoethyl)-phenoxy]-isobutyric acid thus obtained was recrystallized from alcohol-water (4:1 by volume) and then had a melting point of 284° C. The corresponding hydrochloride has a melting point of 187–189° C.

A solution of 58 g. (0.26 mol) of this carboxylic acid in 600 ml. absolute alcohol was gasified, while stirring and with ice cooling, from the surface with dry hydrogen chloride until the solution was saturated. The reaction mixture was left to stand for twelve hours in a closed vessel. Subsequently, the alcohol and hydrogen chloride were removed in a vacuum. The residue was then poured into water and extracted three times with ether and the aqueous phase was rendered clearly alkaline and extracted three times with chloroform. The combined chloroform extracts were washed with a little water, dried over anhydrous potassium carbonate and then evaporated. By distillation of the residue, there were obtained between 125 and 128° C./0.1 mm. Hg, 53.2 g. (82% of theory) colorless ethyl α-[4-(2-aminoethyl)-phenoxy]-isobutyrate.

By the reaction of 1 mol ethyl α-[4-(2-aminoethyl)-phenoxy]-isobutyrate with 1 mol benzoyl chloride in a manner analogous to that described in Example 1, there was obtained, in a yield of 97% of theory, ethyl α-[4-(benzoylaminoethyl)-phenoxy]-isobutyrate, which has a melting point of 65–66° C. The mixed melting point with the compound prepared according to Example 1 showed no depression.

For the preparation of the N-acetyl-tyramine used as starting material, there can be used, for example, one of the following methods:

(1) 64.0 g. (0.466 mol) tyramine were mixed, while stirring, with 200 ml. acetic anhydride, the mixture undergoing spontaneous heating up and a clear solution being formed. This solution was seeded with a few crystals of N-acetyl-tyramine, crystallization taking place immediately. The reaction mixture was cooled rapidly, filtered with suction, washed with ether and water and dried. There were obtained 59 g. (71% of theory) N-acetyl-tyramine, which has a melting point of 124–126° C. By evaporation of the mother liquor, dissolving of the residue in a dilute aqueous solution of sodium hydroxide, filtration and acidification of the filtrate, there were obtained a further 5.5 g. (6% of theory) of product with a melting point of 122–124° C. After recrystallization from ethyl acetate, the N-acetyl-tyramine melted at 129–131° C.

(2) 65.8 g. (0.84 mol) acetyl chloride were added dropwise, with stirring, at 30–35° C., to a solution of 54.9 g. (0.4 mol) tyramine in 200 ml. pyridine. Subsequently, the reaction mixture was heated for fifteen minutes on a boiling waterbath, then cooled and poured into an ice-water mixture. It was then rendered clearly acidic by the addition of concentrated hydrochloric acid and subsequently extracted with chloroform. The chloroform phase was washed with water, dried over anhydrous calcium chloride and then evaporated. There remained a residue of 88.5 g. (quantitative yield) diacetyl-tyramine which, after recrystallization from benzene, had a melting point of 99–100° C. The diacetyl-tyramine was now dissolved in 500 ml. methanol. 800 ml. (0.8 mol) 1 N potassium hydroxide solution was now added dropwise, the temperature thereby increasing to about 30° C., and the reaction mixture maintained at an internal temperature of 50° C. for two hours. It was then cooled, rendered weakly acidic with concentrated hydrochloric acid and the methanol evaporated off in a vacuum. The product which crystallized out was filtered off with suction, thoroughly washed with water and then dried. There were obtained 58.3 g. (81% of theory) N-acetyltyramine which, after recrystallization from ethyl acetate, had a melting point of 131° C.

EXAMPLE 9

Preparation of ethyl 4-benzoylaminomethyl-phenoxyacetate

In a manner analogous to that described in Example 3, from 4-(acetaminomethyl)-phenol and ethyl bromoacetate, there was obtained ethyl 4-(acetaminomethyl)-phenoxyacetate in a yield of 92% of theory. After recrystallization from isopropanol, it had a melting point of 90–91° C.

By saponification of ethyl 4-(acetaminomethyl)-phenoxyacetate in the manner described in Example 8, there was obtained 4-(aminomethyl)-phenoxyacetic acid in a yield of about 90% of theory; M.P. 231–232° C.

From this carboxylic acid there was obtained, by esterification with ethanol and hydrogen chloride in a manner analogous to that described in Example 8, ethyl 4-(aminomethyl)-phenoxyacetate, the yield being 71% of theory. After recrystallization from ethanol, the corresponding hydrochloride had a melting point of 190–191° C.

This compound was benzoylated in a manner analogous to that described in Example 5 to give ethyl 5-benzoylaminomethyl-phenoxyacetate in a yield of 90% of theory; M.P. 96–97° C. The mixed melting point with the compound prepared according to Example 6 showed no depression.

The 4-(acetaminomethyl)-phenol used as starting material was prepared in the following manner: 14.9 ml. (0.2 mol) acetyl chloride was added dropwise, with cooling, to a solution of 15.9 g. (0.1 mol) 4-hydroxybenzylamine in 100 ml. anhydrous pyridine. The reaction mixture was subsequently stirred for one hour at 20° C., then heated in a boiling waterbath for 15 minutes and acidified with concentrated hydrochloric acid. The acidic solution was extracted with chloroform and the chloroform phase was dried over anhydrous sodium sulfate and then evaporated. The crude 4-(acetaminomethyl)-phenyl acetate was dissolved in ethyl acetate and again precipitated out by the addition of ligroin. There was obtained a yield of 18.86 g. (91% of theory); M.P. 78–79° C.

By heating for two hours a mixture of 4-(acetaminomethyl)-phenyl acetate, methanol and 1 N aqueous potassium hydroxide solution, there was obtained, in a manner analogous to that described in Example 1, paragraph 2, 84% of theory 4-(acetaminomethyl)-phenol which, after recrystallization from isopropanol, had a melting point of 131–132° C.

In an analogous manner, ethyl α-(4-benzoylaminomethyl)-phenoxy-isobutyrate was obtained from 4-(acetaminomethyl)-phenol and ethyl α-bromoisobutyrate via the following intermediate stages: ethyl α-[4-(acetaminomethyl)-phenoxy]-isobutyrate (yield 90% of theory; M.P. 84–85° C. after recrystallization from ether/ligroin); α-acetaminomethyl)-phenoxy]-isobutyric acid [by heating for five hours at 60° C. a mixture of 108 g. (0.39 mol) ethyl α-[4 - (acetaminomethyl)-phenoxy]-isobutyrate, 1.5 liters methanol and 635 ml. 1 N aqueous potassium hydroxide solution and subsequent neutralization with 635 ml. 1 N hydrochloric acid, then evaporation in a vacuum; M.P. 155–157° C., after recrystallization from isopropanol]; α-[4-(aminomethyl)-phenoxy]-isobutyric acid (yield 84% of theory; M.P. 221–222° C.); ethyl α-[4 - (aminomethyl)-phenoxy]-isobutyrate (yield 49% of theory; B.P. 113–120° C./0.06 mm. Hg); the compound obtained in 95% yield by subsequent benzoylation melted at 75–76° C. and showed no melting point depression in admixture with compound obtained according to Example 5.

EXAMPLE 10

Preparation of α-{4-[3-(3-chlorobenzoylamino)-propyl]-phenoxy}-isobutyric acid 26.2 g. (0.15 mol) 4 - chlorobenzoyl chloride were added dropwise to a solution of 37.0 g. (0.133 mol) 3-(4-benzyloxyphenyl)-propylamine hydrochloride in 500 ml. pyridine. Subsequently, the reaction mixture was maintained for 15 minutes on a boiling waterbath, then cooled and poured into 2 liters water. The product which precipitated was filtered off with suction, digested with an aqueous solution of sodium bicarbonate, washed with water, dried and recrystallized from ethanol. There were obtained 41.5 g. (82% of theory) 4-chlorobenzoic acid [3 - (4 - benzyloxyphenyl)-propylamide] in the form of yellowish crystals; M.P. 128–129° C.

A mixture of 45.5 g. (0.12 mol) 4-chlorobenzoic acid [3 - (4 - benzyloxyphenyl)-propylamide], 600 ml. dimethyl formamide and 2 g. palladium charcoal (10% Pd) was gasified at atmospheric pressure with the calculated amount of hydrogen. Subsequently, the catalyst was filtered off and the filtrate evaporated in a vacuum. The crystalline evaporation residue can be recrystallized from isopropanol. There were obtained 24.7 g. (72% of theory) 4 - chlorobenzoic acid [3 - (4 - hydroxyphenyl)-propylamide]; M.P. 146–147° C.

A mixture of 14.5 g. (50 mMol) 4-chlorobenzoic acid [3 - (4 - hydroxyphenyl)-propylamide], 6.9 g. (50 mMol) powdered, dry potassium carbonate and 200 ml. anhydrous butan-2-one was stirred for 2 hours at 80° C., and then 9.8 g. (50 mMol) ethyl α-bromoisobutyrate, as well as 0.5 g. potassium iodide, were added and the reaction mixture maintained at reflux temperature for 24 hours. After the addition of a further 3.45 g. potassium carbonate and 4.9 g. ethyl α-bromoisobutyrate, the reaction mixture was heated under reflux for 72 hours, subsequently evaporated in a vacuum and the contents of the reaction flask used taken up in chloroform. The chloroform phase was extracted with dilute aqueous sodium hydroxide solution, washed neutral with water, finally dried over anhydrous calcium chloride and evaporated. There remained behind 8.5 g. of an oily substance which consisted of almost pure ethyl α-{4-[3-(4-chlorobenzoylamino)-propyl]-phenoxy}-isobutyrate.

4.0 g. (10 mMol) of this ethyl ester were dissolved in 50 ml. methanol and stirred with 15 ml. (15 mMol) 1 N aqueous potassium hydroxide solution for 1 hour at 40–50° C. Subsequently, the reaction mixture was neutralized with 15 ml. 1 N hydrochloric acid, the methanol was distilled off in a vacuum, the precipitate formed was filtered off with suction and the aqueous phase was extracted with ether. After evaporation of the ether, there remained a semi-solid residue which was combined with the precipitate and recrystallized from isopropanol. There were obtained 2.5 g. (68% of theory) α-{4-[3-(4-chlorobenzoylamino)-propyl]-phenoxy}-isobutyric acid; M.P. 121–122° C.

For the preparation of the 3-(4-benzyloxyphenyl)-propylamine used as starting material, the following method was used: a solution of 45 g. (0.271 mol) 3-(4-hydroxyphenyl)-propionic acid in 250 ml. dimethyl sulphoxide was mixed with 70 g. powdered, dry potassium carbonate and stirred for 1 hour at 80–85° C. and then cooled. Subsequently, 75.5 g. (0.596 mol) benzyl chloride were added thereto dropwise and the reaction mixture stirred for 2 hours at 80–85° C. After suction filtration, the filtrate was evaporated under oil pump vacuum and the oily residue cooled, whereby it crystallized. After recrystallization thereof from ethanol, there were obtained 74.0 g. (79% of theory) colorless benzyl 3-(4-benzyloxyphenyl)-propionate; M.P. 43–44° C.

59 g. (0.144 mol) of this benzyl ester were stirred for 7 hours at 20° C. with 325 ml. 2 N aqueous potassium hydroxide solution and 210 ml. ethanol. Subsequently, the solution was adjusted to pH 6.5 with hydrochloric acid and the alcohol distilled off. A part of the acid thereby already precipitated out. Water was added to the distillation residue, which was then rendered strongly acidic with hydrochloric acid and filtered. The filter cake obtained was washed with water, dried and finally recrystallized from ethanol. There were obtained 34 g. (92% of theory) colourless 3-(4-benzyloxyphenyl)-propionic acid; M.P. 121–122° C.

A mixture of 128 g. (0.5 mol) 3-(4-benzyloxyphenyl)-propionic acid, 69 ml. triethylamine and 500 ml. anhydrous chloroform were added dropwise, with stirring, at −30° C. to a solution of 46 ml. ethyl chloroformate in 500 ml. anhydrous chloroform. Subsequently, the reaction mixture was stirred for 1.5 hours, without external cooling, the internal temperature thereby increasing to −5° C. At this temperature of −5° C., a slow current of dry gaseous ammonia was passed in, while stirring. The reaction mixture was left to stand overnight in a closed vessel, filtered with suction, shaken out with cold 0.5 N aqueous sodium hydroxide solution, thereafter washed with water and the chloroform phase dried over anhydrous sodium sulphate. After evaporation in a vacuum, the evaporation residue was recrystallized from alcohol. In this manner, there was obtained 3-(4-benzyloxyphenyl)-propionamide in a yield of 80% of theory; M.P. 159–160° C.

Into a round-bottomed flask, equipped with a Soxhlet extractor, the thimble of which contained 12.8 g. (50 mMol) 3-(4-benzyloxyphenyl)-propionamide, there was placed a mixture of 7.6 g. (0.2 mol) lithium aluminium hydride and 100 ml. anhydrous tetrahydrofuran, followed by heating for 20 hours at reflux temperature, whereby the amide was slowly extracted from the thimble and passed to the reducing agent. Subsequently, decomposition was carried out by the addition of 8 ml. water, 8 ml. 15% aqueous sodium hydroxide solution and again with 24 ml. water, in the given order, while cooling. The precipitate formed was filtered off with suction and washed with tetrahydrofuran. After evaporation of the tetrahydrofuran, 12.2 g. of a viscous yellow oil remained behind, which was dissolved in 40 ml. dioxan. After filtration, the filtrate was mixed with hydrogen chloride-containing dioxan, the precipitated hydrochloride was filtered off with suction and recrystallzed from dioxan to which a small amount of concentrated hydrochloric acid had been added. There were obtained 10.2 g. (73% of theory) 3-(4-benzyloxyphenyl)-propylamine hydrochloride; M.P. 230–233° C.

EXAMPLE 11

In a manner analogous to that described in Example 3, there was obtained ethyl α-[4-(4-chlorobenzoylaminoethyl)-phenoxy]-propionate from 4-(4-chlorobenzoylaminoethyl)-phenol and ethyl α-bromopropionate, the yield being 77% of theory. After recrystallization from alcohol, the product had a melting point of 127° C.

EXAMPLE 12

In a manner analogous to that described in Example 4, there was obtained α-[4-(4-chlorobenzoylaminoethyl)-phenoxy]-propionic acid from ethyl α-[4-(4-chlorobenzoylaminoethyl)-phenoxy]-propionate, the yield being 90% of theory. After recrystallization from ethanol, the product had a melting point of 185–186° C.

EXAMPLE 13

Preparation of ethyl α-[4-(2-methylbenzoylaminoethyl)-phenoxyl]-isobutyrate 45.15 g. (292 mMol) 2-methylbenzoyl chloride were added dropwise, within the course of 10 minutes, to 20.1 g. (146 mMol) tyramine in 60 ml. anhydrous pyridine, while stirring and with the exclusion of moisture and thereafter rinsed with 50 ml. anhydrous pyridine. The solution, which automatically heated up during the addition of the 2-methylbenzoyl chloride, was subsequently heated to 100° C. for 15 minutes in order to complete the reaction, then cooled to 35° C. and poured into a mixture of about 500 g. ice and water. The resultant crystalline slurry was acidified with dilute hydrochloric acid, filtered off with suction, washed with dilute hydrochloric acid, water and aqueous sodium bicarbonate solution and dried. After recrystallization from acetone, there were obtained 49.2 g. (90% of theory) di-(2-methylbenzoyl)-tyramine which, after further recrystallization from ethanol, had a melting point of 129–130° C.

41.0 g. (0.11 mol) di-(2-methylbenzoyl)-tyramine were suspended in 400 ml. methanol, 130 ml. 2 N aqueous potassium hydroxide solution were added thereto and the mixture heated to 40–45° C. for 1 hour. After cooling, 130 ml. 2 N hydrochloric acid were added. The precipitate formed was filtered off with suction, the filtrate freed from methanol in a vacuum and the precipitate thereby obained combined with the hydrochloric acid precipitate. The combined precipitates were washed with water and, for the removal of any benzoic acid which may be present, were digested with an aqueous solution of sodium bicarbonate. After recrystallization from ethanol, there were obtained 20.8 g. (74% of theory) N-(2-methylbenzoyl)-tyramine, which had a melting point of 108–109° C.

This compound can advantageously also be prepared according to the following one-pot process.

13.7 g. (0.1 mol) tyramine were stirred into a solution of 23 g. (0.41 mol) potassium hydroxide in 300 ml. water, 32.4 g. (0.21 mol) 2-methylbenzoyl chloride then added thereto dropwise, a precipitate thereby forming immediately, whereafter the reaction mixture was stirred for 1 hour. Subsequently, 600 ml. methanol were added and the reaction mixture maintained at a temperature between 40 and 50° C. for 2 hours, while further stirring. The methanol was then evaporated off in a vacuum and the residue weakly acidified with hydrochloric acid. The precipitate formed was filtered off with suction, then digested with an aqueous solution of sodium bicarbonate and again filtered off with suction. After drying, the product was recrystallized from ethanol and then from acetone. There was obtained N - (2 - methylbenzoyl)-tyramine in an amount of 22.5 g. (88% of theory); M.P. 108–109° C.

A mixture of 51.5 g. (0.2 mol) N-(2-methylbenzoyl)-tyramine, 34.5 g. (0.25 mol) dry potassium carbonate and 500 ml. methyl ethyl ketone was maintained at reflux temperature for 2 hours, while stirring. Subsequently, 58.5 g. (0.3 mol) ethyl α-bromoisobutyrate were added thereto and the reaction mixture boiled for a further 6 hours, while stirring. Thereafter, a further 10.5 g. (0.054 mol) ethyl α-bromoisobutyrate and 13.8 g. (0.1 mol) potassium carbonate were added thereto and the reaction mixture further refluxed for 16 hours. The solid material on the bottom of the reaction vessel used was filtered off and thoroughly washed with acetone. The combined filtrates were evaporated in a vacuum and the crystalline residue was recrystallized from acetone. In this manner, there was obtained ethyl α-[4-(2-methylbenzoylaminoethyl)-phenoxy]-isobutyrate in a yield of 62% of theory. After recrystallization from ethanol, the product had a melting point of 82° C.

In an analogous manner, from 4-methylbenzoyl chloride and tyramine, there was obtained: di-(4-methylbenzoyl)-tyramine (yield 77%; M.P. 186° C.); N-(4-methylbenzoyl)-tyramine (yield 90%; M.P. 178° C.); and finally ethyl α-[4 - (4 - methylbenzoylaminoethyl) - phenoxy]-isobutyrate (yield 75%; M.P. 99° C.).

EXAMPLE 14

Preparation of α-[4-(2-methylbenzoylaminoethyl)-phenoxy]-isobutyric acid 36.95 g. (0.1 mol) ethyl α-[4-(2-methylbenzoylaminoethyl)-phenoxy]-isobutyrate were suspended in 400 ml. methanol and mixed at ambient temperature with 200 ml. 1 N aqueous potassium hydroxide solution. The suspension was stirred for 2 hours at 40–50° C., whereby the starting material went completely into solution, cooled and neutralized with 200 ml. 1 N hydrochloric acid. Thereafter, the solvent was distilled off in a vacuum and the residue was washed free of salt and recrystallized from acetone. There were obtained 30.2 g. α-[2-(2-methylbenzoylaminoethyl)-phenoxy]-isobutyric acid (89%, of theory); M.P. 144–145° C.

In an analogous manner, there was obtained α-[4-(4-methylbenzoylaminoethyl) - phenoxy] - isobutyric acid; yield 93%; M.P. 170–171° C.

EXAMPLE 15

Preparation of ethyl α-[4-(2-methylbenzoylamino-methyl)-phenoxy]-isobutyrate 12 g. (75 mMol) 4-hydroxybenzylamine hydrochloride were dissolved in 100 ml. anhydrous pyridine, 10 g. powdered anhydrous potassium carbonate were added thereto and 23.2 g. (0.15 mol) 2-methylbenzoyl chloride added dropwise, the temperature thereby increasing spontaneously. Subsequently, the reaction mixture was heated for 20 minutes to 90° C., concentrated in a vacuum to one third, cooled and stirred into 200 ml. water. The mixture was now adjusted to pH 6.5 with hydrochloric acid and the precipitate formed was filtered off with suction and thereafter recrystallized from ethanol. There were obtained 25.0 g. (93% of theory) [4-(2-methyl-benzoylaminomethyl)-phenyl]-2 - methylbenzoate, which had a melting point of 134–135° C.

18.0 g. (0.05 mol) [4-(2-methylbenzoylaminomethyl)-phenyl]-2-methylbenzoate were suspended in a liter acetone and saponified with aqueous potassium hydroxide solution in the manner described in Example 1. There were obtained 9.85 g. (81% of theory) 4 - (2 - methyl-benzoylaminomethyl)-phenol which, after recrystallization from ethanol, had a melting point of 161–162° C.

4-(2-methylbenzoylaminomethyl) - phenol was reacted with ethyl α-bromoisobutyrate in a manner analogous to that described in Example 1 to give ethyl α-[4-(2-methylbenzoylaminomethyl)-phenoxy]-isobutyrate, the yield being 80% of theory. After reprecipitation from ether/ligroin, the product had a melting point of 74–75° C.

In an analogous manner, α-[4-(4-methylbenzoylamino-methyl)-phenoxy]-isobutyric acid ethyl ester was obtained from 4-methylbenzoyl chloride and 4-hydroxybenzyl-amine hydrochloride via the following intermediate stages: [4-(4 - methylbenzoylaminomethyl) - phenyl] 4-methylbenzoate (yield 80% of theory; M.P. 186° C.); 4-(4 - methylbenzoylaminomethyl) - phenol (yield 81% of theory; M.P. 136–137° C.); and finally ethyl α-[4-(4-methylbenzoylaminomethyl)-phenoxy]-isobutyrate (yield 78% of theory; M.P. 80–81° C., after recrystallization from ether/ligroin).

EXAMPLE 16

The following compounds were obtained in a manner analogous to that described in Example 2:

(a) α-[4-(2-methylbenzoylaminomethyl) - phenoxy]-isobutyric acid from ethyl α-[4-(2-methylbenzoylamino-methyl) - phenoxy] - isobutyrate in a yield of 78% of theory. After recrystallization from acetone, the compound melted at 127–128° C.;

(b) α-[4-(4-methylbenzoylaminomethyl) - phenoxy]-isobutyric acid from ethyl α-[4-(4-methylbenzoylamino-methyl) - phenoxy] - isobutyrate in a yield or 84% of theory. After recrystallization from acetone, the compound melted at 163–165° C.

The ability of the instant compounds to lower the serum lipid level and the cholesterol level is demonstrated by the following illustrative experiments:

Male rats of a weight of about 200 g. (10 animals per substance in each case) were given for 6 days a powdered fodder of the company Intermast GmbH, Bockum-Hövel (manufacturer: Plange, Soest), which contained admixed thereto the substances to be tested in the concentrations listed below. Without interruption of the feeding of the substances, the animals were killed by neck blow and bled white. In the serum the triglycerides were determined enzymatically according to Kreutz and Eggstein (Klin. Wschr. 40, 363/1962; 44, 262/1966) in the modification according to Schmidt et al. (Z. Klin. Chem. and Klin. Biochem. 6, 156/1968) and cholesterol was determined colorimetrically according to Watson (Klin. Chim. Acta 5, 637/1960).

The results are set forth in Table I below:

TABLE I

| Test substance | Prep. ex., supra | Concentr. in the fodder in percent | Reduction in percent Triglycerides | Reduction in percent Cholesterol |
|---|---|---|---|---|
| 2-(p-chlorophenoxy)-2-methyl-propionic acid ethyl ester (Clofibrat=Regelan—Comparison compound) | | 0.056 | 21 | 0 |
| α-[4-(benzoylaminoethyl)-phenoxy]-isobutyric acid | 2 | 0.1 | 44 | 28 |
| α-[4-(4-chlorobenzoylamino-ethyl)-phenoxy]-isobutyric acid | 2 | 0.05 | 51 | 21 |
| α-[4-(2-methoxy-5-chloroben-zoylaminoethyl)-phenoxy]-isobutyric acid | 2 | 0.05 | 43 | 24 |
| α-[4-(2-methoxy-5-chloroben-zoylaminoethyl)-phenoxy]-isobutyric acid ethylester | 1 | 0.1 | 44 | 24 |
| α-[4-(benzoylaminomethyl)-phenoxy]-isobutyric acid | 7 | 0.1 | 32 | 27 |
| α-[4-(4-chlorobenzoylamino-methyl)-phenoxy]isobutyric acid | 7 | 0.25 | 49 | 29 |
| α-[4-(4-methylbenzoylamino-ethyl)-phenoxy]-isobutyric acid | 14 | 0.05 | 15 | 13 |
| α-[4-(4-methylbenzoylamino-methyl)-phenoxy]-isobutyric acid | 16 | 0.05 | 27 | 25 |
| α-[4-(2-methylbenzoylamino-ethyl)-phenoxy]-isobutyric acid | 14 | 0.05 | 39 | 27 |
| α-[4-(4-chlorobenzoylamino-ethyl)-phenoxy]-propionic acid | 12 | 0.05 | 33 | 13 |

From the above it can be seen that the new substances are superior to the known anti-hyperlipidaemic, Clofibrat, in particular with respect to cholesterol-reducing action.

The novel compounds may be administered by themselves or in conjunction with carriers which are pharmacologically acceptable, either active or inert. The dosage units are similar to those of the heretofore known anti-cholesterol agents, e.g. about 1 to 2 grams per day for an adult or about 30 mg./kg. per day although higher or lower dosages can be used. Rather than a single dose it is preferable if the compounds are administered in the course of a day, i.e. about four applications of 500 mg. each at spaced time intervals or 8 of about 250 mg. each. A convenient form of administration is in a gelatin capsule.

It will be appreciated that the instant specification and examples are set forth by way of illustration and not limitation, and that various modifications and changes may be made without departing from the spirit and scope of the present invention.

What is claimed is:

1. Phenoxy-alkyl-carboxylic acid compounds of the formula:

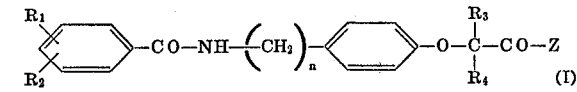

wherein $R_1$ and $R_2$, which may be the same or different, are hydrogen, chlorine, lower alkyl or lower alkoxy;

$R_3$ and $R_4$, which may be the same or different, are hydrogen or lower alkyl;

$n$ is 1, 2 or 3; and Z is hydroxyl or lower alkoxy;

and the pharmacologically compatible salts thereof.

2. Compound as claimed in claim 1 wherein $R_1$ is hydrogen.

3. Compound as claimed in claim 1 wherein $R_1$ is chlorine.

4. Compound as claimed in claim 1 wherein $R_1$ is alkyl of from 1 to 6 carbon atoms.

5. Compound as claimed in claim 1 wherein $R_1$ is alkoxy of from 1 to 6 carbon atoms.

6. Compound as claimed in claim 1 wherein $R_2$ is hydrogen.

7. Compound as claimed in claim 1 wherein $R_2$ is chlorine.

8. Compound as claimed in claim 1 wherein $R_2$ is alkyl of from 1 to 6 carbon atoms.

9. Compound as claimed in claim 1 wherein $R_2$ is alkoxy of from 1 to 6 carbon atoms.

10. Compound as claimed in claim 1 wherein $R_3$ is hydrogen.

11. Compound as claimed in claim 1 wherein $R_3$ is alkyl of from 1 to 6 carbon atoms.

12. Compound as claimed in claim 1 wherein $R_4$ is hydrogen.

13. Compound as claimed in claim 1 wherein $R_4$ is alkyl of from 1 to 6 carbon atoms.

14. Compound as claimed in claim 1 wherein $n$ is one.

15. Compound as claimed in claim 1 wherein $n$ is two.

16. Compound as claimed in claim 1 wherein $n$ is three.

17. Compound as claimed in claim 1 wherein Z is hydroxyl.

18. Compound as claimed in claim 1 wherein Z is alkoxy of from 1 to 6 carbon atoms.

19. Compound as claimed in claim 1 wherein said compound is α-[4-(4 - chlorobenzoylaminoethyl) - phenoxy]-isobutyric acid.

20. Compound as claimed in claim 1 wherein said compound is α-[4-(2-methoxy - 5 - chlorobenzoylaminoethyl)-phenoxy]-isobutyric acid.

21. Compound as claimed in claim 1 wherein said compound is α-[4-(4 - methylbenzoylaminomethyl)-phenoxy]-isobutyric acid.

22. Compound as claimed in claim 1 wherein said compound is α-[4-(2 - methylbenzoylaminoethyl) - phenoxy]-isobutyric acid.

23. Compound as claimed in claim 1 wherein said compound is α-[4-(4 - chlorobenzoylaminoethyl) - phenoxy]-propionic acid.

References Cited
UNITED STATES PATENTS
3,644,518    2/1972    Yoshida et al. ——————— 260—519

LORRAINE A. WEINBERGER, Primary Examiner

L. A. THAXTON, Assistant Examiner

U.S. Cl. X.R.

260—404, 519; 424—309, 318, 319